June 20, 1961   M. V. LEWIS   2,988,958
ADJUSTABLE REAR VIEW MIRROR
Filed June 18, 1959

Marion V. Lewis
INVENTOR.

BY
ATTORNEY

United States Patent Office 2,988,958
Patented June 20, 1961

2,988,958
ADJUSTABLE REAR VIEW MIRROR
Marion V. Lewis, Rte. 3, Box 100J, Houston, Tex.
Filed June 18, 1959, Ser. No. 821,240
4 Claims. (Cl. 88—98)

This invention relates to new and useful improvements in an adjustable rear view mirror.

It is an object of this invention to provide a rear view mirror for use in automotive vehicles having a novel means for rapid position adjustment of the mirror, such means being, in addition to an adjusting means, locking means for retaining the mirror in the adjusted position.

Figure 1:
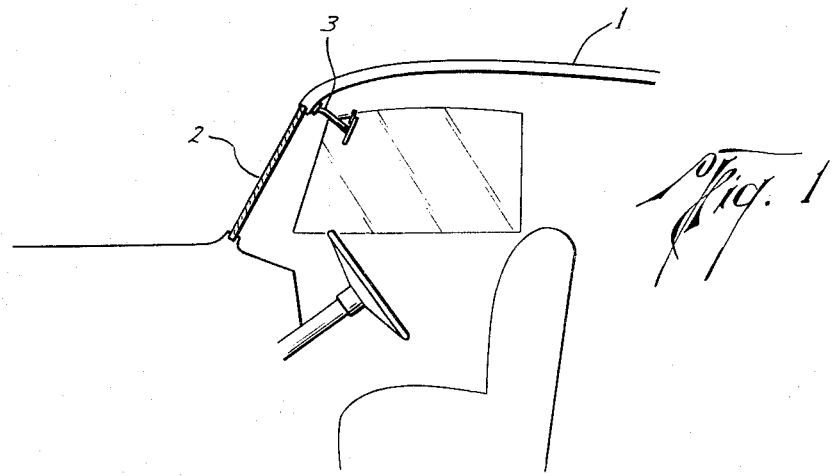
Figure 2:
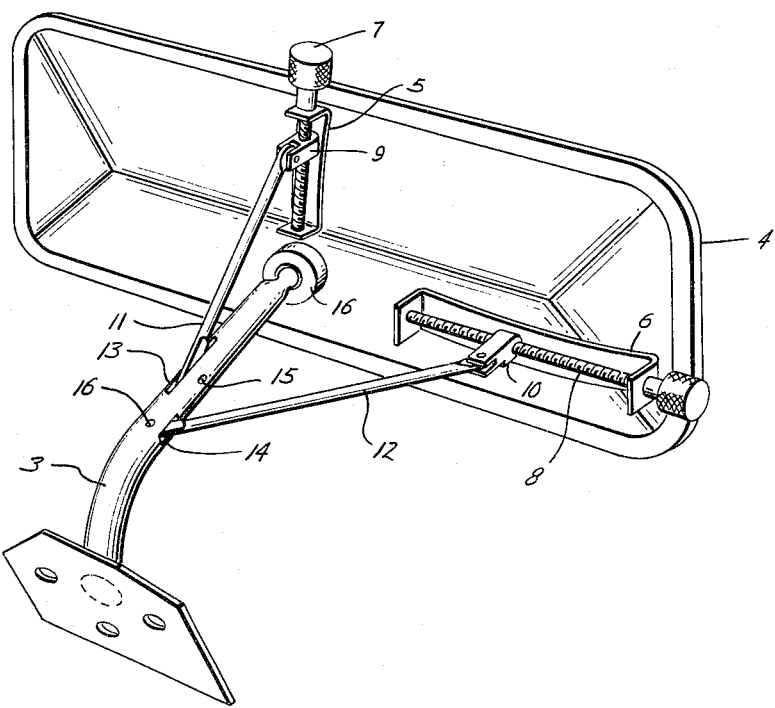

With the above and other objects in view, the invention has relation to certain novel features of construction, operation and arrangement of parts more particularly defined in the following specifications and illustrated in the accompanying drawings, wherein:

FIGURE 1 is a side elevational view of the device as attached to a motor vehicle, and FIGURE 2 is a rear elevational view of the device, showing the means for adjusting the position of the mirror.

Referring now more particularly to the drawings the numeral 1 refers to a vehicle such as a passenger automobile having the usual windshield 2, above which the rear view mirror support 3 is mounted. The mirror framework 4 is provided with the vertical adjusting screw bracket 5 and the horizontal adjusting screw bracket 6. Mounted in the vertical adjusting screw bracket 5 is the adjusting screw 7 and mounted in the horizontal adjusting screw bracket 6 is the adjusting screw 8. Each of said screws 7 and 8, are provided with a knurled head at one end thereof and the reduced externally threaded shaft positioned within the adjusting screw brackets.

Mounted on the threaded shafts of the screws 7 and 8 are suitable guides as 9, 10, having internally threaded passageways therethrough which receive the threaded portion of the screws 7, 8 adjacent one end, and at the other end of the guides 9, 10 a groove is formed in which one end of the arms 11, 12 are pivotally mounted. The other ends of the arms 11, 12 are pivotally mounted to the support 3 in suitable slots as 13, 14, and which may be anchored in position as by the pins 15, 16.

The mirror framework 4 is pivotally mounted on the support 3 in the usual manner as by the ball joint 16. When it is desired to adjust the mirror, the operator will rotate the screw 7 to move the mirror top in a rocking motion on the joint 16, and will move the mirror in an endwise rocking movement by rotating the screw 8. Upon rotation of the screws 7, 8, the guides 9, 10 will move longitudinally on the threaded portions of the screws 7, 8 in accordance with the direction of rotation of the screws changing the angle between the levers 11, 12 respectively and the framework 4, to quickly and simply alter the field of reflection in the mirror.

While the foregoing is considered a preferred form of the invention, it is by way of illustration only, the broad principle of the invention being defined by the appended claims.

What I claim is:

1. In a rear view mirror for vehicles, a support, a mirror framework pivotally mounted on said support, vertical and horizontal adjusting screws mounted on said framework, arms having one end pivotally mounted on said support and the other end mounted on said framework and being movable by said adjusting screws.

2. In a rear view mirror for vehicles, a support, a mirror framework pivotally mounted on said support, vertical and horizontal adjusting screw brackets mounted on said framework, rotatable adjusting screws mounted in said brackets, guides mounted on said adjusting screws and movable longitudinally thereon, and arms having one end pivotally mounted on said support and the other end mounted on said guides.

3. In a rear view mirror for vehicles, a mirror framework support, a mirror framework pivotally mounted on said support, vertical and horizontal adjusting screw brackets mounted on said framework, externally threaded adjusting screws rotatably mounted in said brackets, longitudinally movable guides on said screws, pivotally mounted arms having one end secured to said guides and the other end secured to said support and grooves in said support to receive the said ends of said arms.

4. In a rear view mirror for vehicles, a longitudinal support, a mounting plate on one end of said support and a mirror framework pivotally mounted on the extended end of said support, a mirror on said framework, a horizontal and a vertical bracket mounted on said framework, externally threaded shafts mounted in said brackets, said shafts having one end extended outwardly from said brackets and having a rotating knob on said extended ends, guides mounted on said threaded shafts and movable longitudinally thereon as the shafts are rotated, vertical and horizontal rigid arms having one end pivotally mounted in the support and the other end pivotally mounted in the vertical and horizontal guides respectively, the rotation of the shafts moving the guides and varying the angle between the framework and support to vary the field of reflection of the mirror.

References Cited in the file of this patent
UNITED STATES PATENTS

| | | |
|---|---|---|
| 1,634,748 | Ischinger | July 5, 1927 |
| 1,672,559 | Doble | June 5, 1928 |
| 2,504,386 | Brady, et al. | Apr. 18, 1950 |
| 2,664,785 | Roehrig | Jan. 5, 1954 |